July 14, 1970        H. R. ASK        3,520,499
FLIGHT CONTROL SYSTEM
Filed May 29, 1968
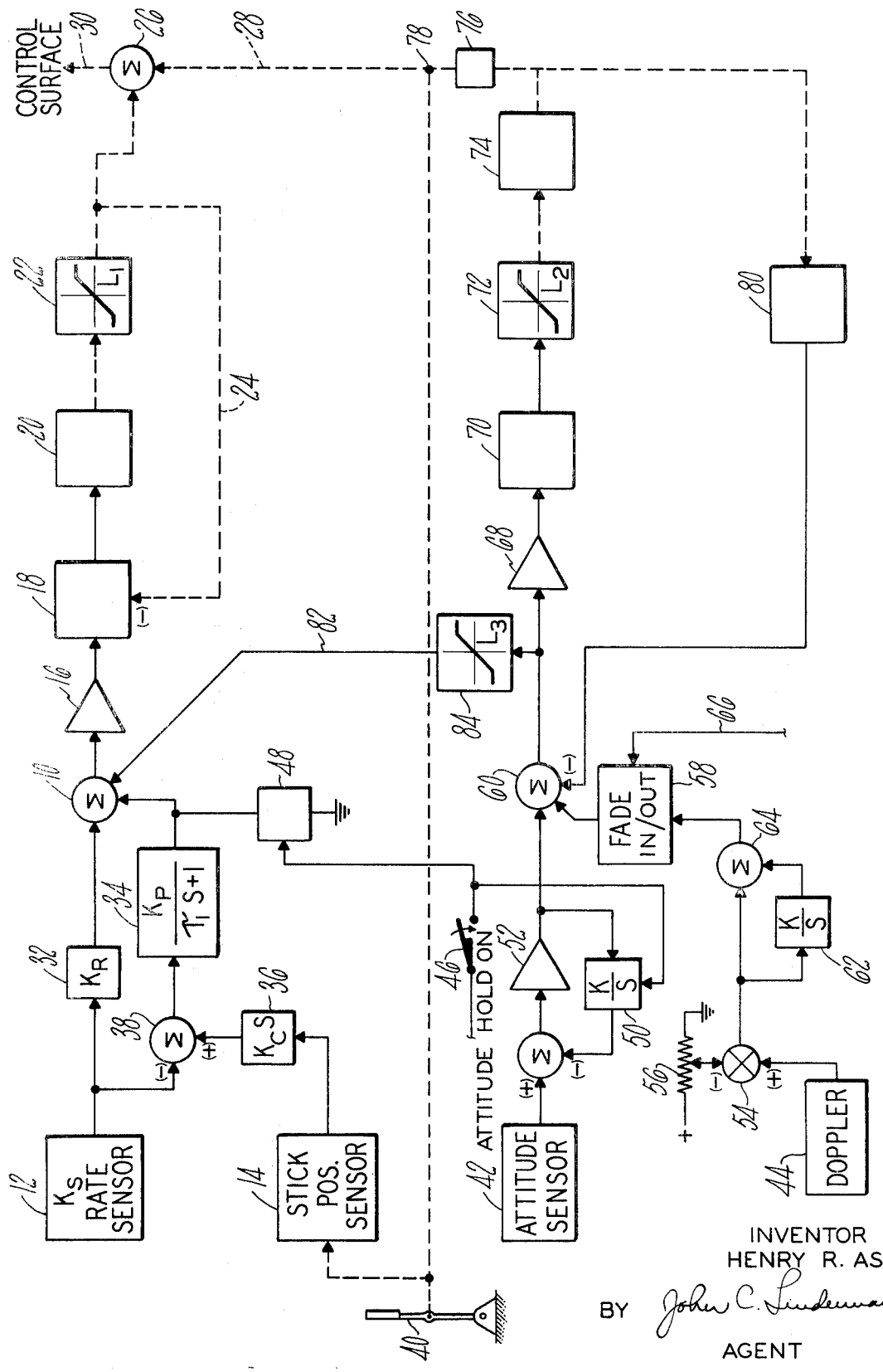
INVENTOR
HENRY R. ASK
BY *John C. Lindeman*
AGENT

United States Patent Office 3,520,499
Patented July 14, 1970

3,520,499
FLIGHT CONTROL SYSTEM
Henry R. Ask, Wapping, Conn., assignor to United Aircraft Corporation, East Hartford, Conn., a corporation of Delaware
Filed May 29, 1968, Ser. No. 732,907
Int. Cl. B64c *13/18*
U.S. Cl. 244—77       10 Claims

ABSTRACT OF THE DISCLOSURE

This invention relates to an aircraft control system which contains an inner control loop for short-term stabilization and an outer control loop for long-term holding functions. A limited authority high response actuator translates the stabilizing commands from the inner loop to the aircraft control surfaces and a slow response, full authority actuator in series with the limited authority actuator is provided to translate the long-term commands from the outer loop to the control surfaces. In order to improve the outer loop response and still maintain the safety aspects of the slow responding full authority actuator, the outer loop feedback error is cross fed from the outer loop to the inner loop actuator.

BACKGROUND OF THE INVENTION

This invention relates to a flight control system for dirigible craft which provides both long and short-term control functions.

The requirements of a flight control system fall into two general categories.

The first of these categories is stability augmentation, and is accomplished by control apparatus commonly referred to in the art as the inner control loop or simply inner loop. Stability augmentation generally provides a fast short-term correction which aids the pilot in controlling the aircraft in opposition to gusts and turbulence that would temporarily disturb the stabilized condition of the aircraft. Because of the short-term control functions, stability augmentation systems require a fast response with only limited authority input to the aircraft controls to accomplish the task. The limited authority is also a safety feature which permits the pilot to manually override the system in the event of a failure. The stability augmentation systems are sometimes considered an assist to a pilot while he maintains control of the aircraft manually; however, these systems are more frequently regarded as a safety-of-flight item rather than a pilot aid.

The second of these categories is a long-term correction function, and is accomplished by control apparatus commonly known as the outer control loop or simply outer loop. This loop controls holding functions such as aircraft attitude or speed. Since these loops generally are pilot aids, full authority inputs are permitted and safety is maintained by reducing the response rate intentionally with a slow response actuator.

It is desirable to have a control system which would also provide a high response rate to the outer loop commands without losing the safety features of a slow response actuator.

SUMMARY OF THE INVENTION

This invention relates to a flight control system for an aircraft which includes both an inner and outer control loop. The flight control system is designed to retain the safety of the limited authority inner loop and rate-limited outer loop system while at the same time the system provides a rapid response to both the inner loop and outer loop commands.

In this control system the inner loop provides rate plug lag-rate stabilization through a limited authority actuator. The actuator is mechanically connected to an aircraft control surface in series with the pilot's manual control member. Normally, the rapid response of the rate plus lag-rate input will provide the necessary short-term stabilization within the limited authority of the actuator yet still permit the pilot to introduce large command changes, for example during maneuver, by overriding the inner loop.

The outer loop provides proportional control from attitude or speed sensors. The outer loop commands are introduced through a rate-limited actuator connected in parallel with the manual control member and in series with the limited authority actuator of the inner loop. When the pilot wishes to maintain manual control of the aircraft, the outer loop sensors and actuator can be disengaged in order to prevent the parallel connection from interfering with the pilot's commands. When the outer loop is engaged, the pilot releases his manual control member and the actuator in the outer loop has full authority to maintain the holding functions.

The rate-limiting feature of the outer loop provides a safety-of-flight feature in the event of a failure in the outer loop which suddenly moves the full authority actuator and the associated control surface to maximum displacement. This is known as a "hard-over" and can cause a dangerous flight condition unless the pilot can reacquire control. The reduced response rate provides additional time for the pilot to react.

Although the rate-limiting feature in the full authority actuator is desirable for safety reasons, it can interfere with control inputs from the outer loop parameters and depreciate the outer loop correction functions.

In order to overcome undesirable results of the slow responding outer loop actuator, a signal representative of the dynamic feedback error between the input and output of the outer loop actuator is transmitted to the high response inner loop actuator. This error signal is generated by a negative feedback signal from the outer loop actuator which is summed with the outer loop commands. With the inner and outer loop actuators connected in series and the inner loop actuator responding to outer loop error, the outer loop control signal profile is reconstructed in the combined output of the actuators.

Since there may be times at which the outer loop dynamic error signal is large, and since the inner loop actuator has limited authority, an error signal limiter is incorporated in the cross-feed between outer and inner loops. The cutoff of this limiter is established at a point below the saturation authority of the inner loop actuator. A cutoff signal level at 50% saturation of the inner loop actuator allows the inner loop actuator to accommodate equal proportions of the inner and outer loop commands.

BRIEF DESCRIPTION OF THE DRAWING

The drawing shows a schematic representation of the flight control system in block diagram form.

DESCRIPTION OF THE PREFERRED EMBODIMENTS

The control system is depicted in a form applicable to a single control axis of an aircraft. For the purposes of description, components comprising the controls in the pitch or roll channel of a helicopter have been chosen.

With reference to the drawing, the summing point 10 represents a summing amplifier which combines the inner loop stabilizing commands from a rate sensor 12 and a stick position sensor 14. The output from the summing point is supplied to a servo amplifier 16 and an inner loop actuator composed of a hydraulic servo valve 18 and a servo piston 20 having a mechanically limited displacement $L_1$ represented at 22. The output displacement of the piston 20 is fed back along path 24 to the servo valve 18 and is applied to the series summing mechanism 26 together with the displacement of the aircraft control linkage 28. The output linkage 30 of the summing mechanism 26 leads to the aircraft control surface.

The function of the inner control loop is to provide short-term stability augmentation and for this purpose a rate plus lag-rate system is employed. The system derives its primary response from a rate sensor 12, such as a rate gyro, and the output of this sensor is supplied to summing amplifier 10 through a proportional amplifier 32 and a pseudo attitude path including a lag network 34. The lag network effectively performs a short-term integration of the rate signal to yield a signal bearing characteristics of attitude deviations on a short-term basis. The time constant of the lag network 34 may be approximately 10 seconds; however, this will depend to a great extent on the size and speed of the aircraft.

Since the inner loop stabilization will be functioning during maneuvers commanded by the pilot through his control stick 40, it is desirable to cancel the pseudo attitude signal and thereby avoid any attitude stabilizing commands which would otherwise oppose the pilot's commands. For this purpose the stick position sensor 14 measures the stick commands and generates a stick signal which is differentiated by rate network 36. The output of network 36, in combination with lag network 34, initially generates a short-term attitude command when a stick command from sensor 14 is given. Initial aircraft response is therefore enhanced. An opposing signal from the rate sensor 12 at summing point 38 then backs off the command as the aircraft responds. Since stick position in a helicopter is roughly proportional to craft attitude, the differentiated signal is approximately equal to rate-of-change of attitude. The differentiated signal then cancels any steady rate signal at summing point 38. The differentiated signal will therefore cancel any long-term signal emanating from the pseudo attitude path which opposes the manual commands of the pilot.

The outer loop includes sensors which perform the holding functions. These sensors include an attitude sensor 42, such as a gyro, and a speed sensor 44, such as a doppler radar system.

Since the attitude sensor and the pseudo attitude path of the inner loop perform essentially similar functions, a mode switch 46 is provided to remove one or the other of these control paths from the automatic control system. The "attitude hold" mode is engaged when switch 46 is closed. In this mode the pseudo attitude path is grounded through electronic switch 48 and a synchronizer 50 is disengaged from the attitude sensor circuit. The synchronizer 50, prior to engagement of the holding mode, nulls the output of the attitude sensor amplifier 52 so that an initial error signal is not abruptly introduced in the outer control loop when the holding mode is selected.

The doppler radar system 44 supplies an electrical speed signal to comparator 54 where a signal from the speed adjusting potentiometer 56 is compared to produce a speed error signal. The speed error signal is fed through a fade in/out circuit 58 to summing point 60. When the attitude hold mode is selected, the fade in/out circuit is triggered through lead 66 to gradually introduce any initial speed error that may exist. In addition to the proportional input, the speed error signal is fed through integrator 62 and summed with the proportional input at summing point 64. The integrator insures that zero steady-state error is maintained. A clamping circuit may be included within the integrator 62 to null any initial integrator error.

The error signals from the attitude sensor 42 and doppler system 44 are combined at summing point 60 and supplied to a servo amplifier 68 and an outer loop actuator composed of a hydraulic servo valve 70, hydraulic flow limiter 72 and a servo piston 74. The servo piston 74 is connected in parallel with the pilot's control stick 40 through a coupling 76. The drawing indicates this parallel connection at the common junction 78 of the linkage 28, control stick 40 and coupling 76. Since the piston 74 during the holding mode effectively performs the same functions as the pilot, the piston 74 is given the same authority as the pilot, i.e., the maximum possible displacement of the controlling linkage 28 by the piston 74 is equal to the maximum possible displacement of the linkage 28 by the control stick 40.

The hydraulic flow limiter 72 interposed between the servo valve 70 and piston 74 effectively passes a maximum flow rate $L_2$ to limit the rate of displacement of the piston 74. The hydraulic flow limiter 72 provides a safety feature in the outer control loop. With the piston 74 having full authority over the control linkage when engaged by coupling 76, the pilot can use the additional response time provided by the limiter to disengage the piston 74 in the event of a "hard-over" command. The intentionally reduced response rate of the outer loop actuator is compensated for as described hereinafter.

The output displacement of piston 74 is also applied to a feedback sensor 80 which supplies an electrical feedback signal to summing point 60. With this feedback, the output of summing point 60 to servo amplifier 68 becomes a dynamic feedback error signal for the outer control loop. This error signal will be zero when the output displacement of piston 74 corresponds precisely with the outer loop signal commands. In this condition, the feedback position signal is equal to the sum of the attitude and speed inputs to summing point 60. During transient conditions, however, a definite error signal can be expected because of the slow actuator response imposed by the limiter 72. In order to introduce into the linkage 30 those outer loop perturbations which cannot be accommodated within the rate $L_2$ of limiter 72, a cross-feed path 82 is provided which transmits the outer loop error signal to the limited authority actuator of the inner control loop. Since the inner loop actuator is designed for rapid short-term stabilization, fast response can be expected. Consequently, the series inner loop actuator will add to the output linkage 30 a displacement proportional to the error of the outer loop actuator. As the outer loop actuator meets the demands of the outer control loop signals, the outer loop error signal will return to zero and the displacement of the inner loop servo due to the error will also return to zero. Therefore, through the combined operation of the inner and outer loop actuators, the outer loop signals are reconstructed in the displacement of the linkage 30 in the manner of a high response, full authority outer loop actuator.

Since the inner loop actuator has a rapid response rate and limited authority, the limited authority being produced by the physical stops of the actuator as represented by block 22, saturation of the actuator is easily reached. This, of course, is an undesirable feature and accordingly a cross-feed limiter 84 having a cutoff signal level $L_3$ is provided. The cutoff level $L_3$ of limiter 84 produces a displacement of piston 20 less than the saturation limit $L_1$ of the inner loop actuator and typically a cutoff level $L_3$ which permits no more than 50% saturation of the inner loop actuator is used. With the 50% saturation level $L_3$, the inner loop actuator can simultaneously accommodate a substantial portion of the inner loop stabilizing commands and the normal dynamic errors of the outer loop. The system is designed so that the inner loop is never operating about the saturation limits of its actuator as shown by $L_1$ at block 22, and due to the fact that the cutoff level $L_3$ of limiter 84 is 50% of the inner loop saturation level, saturation of the inner loop at $L_1$ as a result of the cross-feed signal added through line 82 is not a problem. Feedback loop 24 around the inner loop actuator prevents full displacement of the inner loop actuator if a cross-feed signal of extended duration from the outer loop is fed to the inner loop through line 82.

The unique advantage of the inner and outer loop control paths with a dynamic error cross feed will be readily understood. The inner loop having a limited authority high response actuator provides the short-term stabilization and also, without saturation, adds the normal dynamic perturbations of the outer loop represented by the dynamic outer loop error signal. The outer loop commands are introduced with a full authority, limited response actuator without losing the short-term perturbations or removing the safety-of flight features permitting the pilot to reassume a command in sufficient time to overcome a "hardover" signal.

While a preferred embodiment of the invention has been shown and described, various modifications and substitutions may be made. For example, accelerometers may constitute the primary high response sensors in the inner loop and the rate sensors may be moved to the slower responding outer loop. In addition to conventional aircraft, the invention may also find utility in other traveling bodies such as missiles and spacecraft. The invention, therefore, is not limited to the specific embodiments illustrated and described, but may be used in other ways.

I claim:

1. A control system for governing aircraft motions associated with a given control axis comprising:
   (a) first control means providing short-term stabilizing commands;
   (b) limited authority means for actuating an aircraft control surface in response to the first control means;
   (c) second control means providing long-term holding commands;
   (d) rate-limited means responsive to the second control means for actuating the aircraft control surface in series with the limited-authority means; and
   (e) third control means for coupling a long-term holding command error from the second control means to the first control means.

2. A control system of claim 1 wherein the third control means includes a limiter to prevent saturation of the limited authority means by large holding command errors.

3. Apparatus of claim 2 wherein the limiter has a cutoff permitting no more than 50% saturation of the limited-authority means.

4. A control system according to claim 1 wherein:
   (a) the first control means provides a rate stabilizing control; and
   (b) the second control means provides a proportional attitude control.

5. The control system of claim 1 wherein:
   (a) the rate-limited means includes a negative feedback signal generator; and
   (b) means are provided for combining the holding commands of the second control means and the negative feedback signal to generate an input signal for the rate-limited means and the long-term holding command error.

6. A flight control system for an aircraft comprising:
   (a) an inner control loop providing short-term, stability augmentation signals and having a limited authority actuator responsive to the augmentation signals and connected to an aircraft control surface;
   (b) an outer control loop providing long-term flight correction signals and having a rate-limited, full authority actuator connected to the aircraft control surface in series with the first actuator, the second actuator having a feedback signal generator;
   (c) means for generating an outer loop error signal from the feedback signal and outer control loop signals; and
   (d) means for applying the error signal as an input to both the full and limited authority actuators.

7. A control system according to claim 6 further including means for limiting the error signal applied to the limited authority actuator.

8. Apparatus according to claim 7 wherein the limiting means is adjusted to transmit a maximum error signal that is less than the level of the augmentation signal which saturates the limited authority actuator.

9. A control system according to claim 6 wherein:
   (a) a manually movable control member is connected to the aircraft control surface in parallel with the full authority actuator; and
   (b) means are provided for operatively disengaging the rate-limited actuator from the control surface.

10. The control system of claim 6 wherein:
    (a) the inner control loop includes rate stabilizing means; and
    (b) the outer control loop includes proportional attitude correcting means.

References Cited

UNITED STATES PATENTS

| | | |
|---|---|---|
| 3,021,097 | 2/1962 | Hecht. |
| 3,071,335 | 1/1963 | Carter _____ 244—77 |
| 3,369,778 | 2/1968 | Ciscel. |
| 3,386,689 | 6/1968 | Parker et al. |

MILTON BUCHLER, Primary Examiner

J. L. FORMAN, Assistant Examiner

U.S. Cl. X.R.
244—17.13, 76